US011889481B2

(12) United States Patent
Khoshnevisan et al.

(10) Patent No.: US 11,889,481 B2
(45) Date of Patent: Jan. 30, 2024

(54) TECHNIQUES FOR RESOURCE BLOCK ALLOCATION IN WIRELESS COMMUNICATIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US); Srinivas Yerramalli, San Diego, CA (US); Kaushik Chakraborty, San Diego, CA (US); Arumugam Chendamarai Kannan, San Diego, CA (US); Sungwoo Park, Seoul (KR); Wooseok Nam, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/585,304

(22) Filed: Jan. 26, 2022

(65) Prior Publication Data

US 2022/0150879 A1 May 12, 2022

Related U.S. Application Data

(63) Continuation of application No. 16/877,834, filed on May 19, 2020, now Pat. No. 11,265,875.

(Continued)

(51) Int. Cl.
*H04W 72/04* (2023.01)
*H04W 72/044* (2023.01)

(52) U.S. Cl.
CPC .................. *H04W 72/044* (2013.01)

(58) Field of Classification Search
CPC ............. H04W 72/044; H04L 27/2605; H04L 5/0007; H04L 27/2636; H04L 5/0091; H04L 27/2614
See application file for complete search history.

(56) References Cited

U.S. PATENT DOCUMENTS 10,218,406 B2   2/2019  Liu et al.
11,265,875 B2 * 3/2022  Khoshnevisan ...... H04L 5/0007
(Continued)

FOREIGN PATENT DOCUMENTS

EP   3327977 A2   5/2018
EP   3404863 A1   11/2018
(Continued)

OTHER PUBLICATIONS

International Preliminary Report on Patentability—PCT/US2020/033796, The International Bureau of WIPO—Geneva, Switzerland, dated Dec. 2, 2021.
(Continued)

*Primary Examiner* — Maharishi V Khirodhar
*Assistant Examiner* — Kenneth P Hunt
(74) *Attorney, Agent, or Firm* — ArentFox Schiff LLP

(57) ABSTRACT

Aspects described herein relate to resource block allocation for time domain single-carrier waveform processing in new radio (NR). Specifically, in an aspect, a guard band may be allocated for a single-carrier waveform in a time or frequency domain. In another aspect, a resource block may be allocated for a time domain single-carrier waveform.

14 Claims, 11 Drawing Sheets

Related U.S. Application Data

(60) Provisional application No. 62/850,207, filed on May 20, 2019.

(56) References Cited

U.S. PATENT DOCUMENTS

| | | | |
|---|---|---|---|
| 2010/0074209 | A1 | 3/2010 | Montojo et al. |
| 2012/0230449 | A1 | 9/2012 | Futatsugi et al. |
| 2013/0176952 | A1* | 7/2013 | Shin ............... H04W 72/23 370/329 |
| 2018/0331870 | A1 | 11/2018 | Sun et al. |
| 2018/0359127 | A9 | 12/2018 | Hakola et al. |
| 2019/0268198 | A1 | 8/2019 | Oketani |
| 2020/0366441 | A1* | 11/2020 | Park ............... H04L 5/0053 |
| 2020/0374852 | A1 | 11/2020 | Khoshnevisan et al. |
| 2022/0078767 | A1* | 3/2022 | Xiong ............... H04L 5/0092 |

FOREIGN PATENT DOCUMENTS

| | | |
|---|---|---|
| WO | 2018044388 A1 | 3/2018 |
| WO | 2018182926 A1 | 10/2018 |

OTHER PUBLICATIONS

International Search Report and Written Opinion—PCT/US2020/033796—ISA/EPO—dated Aug. 18, 2020.

Nokia et al., "On Spectrum Shaping for Uplink Pi/2 BPSK with DFT-S-OFDM", 3GPP Draft, R1-1709002, 3GPP TSG-RAN WG1#89, Spectrum Shaping Final, 3rd Generation Partnership Project (3GPP), Mobile Competence Centre, 650, Route Des Lucioles, F-06921, Sophia-Antipolis, Cedex, France, vol. RAN WG1, No. Hangzhou, May 15, 2017-May 19, 2017, May 5, 2017 (May 5, 2017), XP051261478, 3 Pages, Retrieved from the Internet: URL:http://www.3gpp.org/ftp/tsg_ran/WG1_RL1/TSGR1_89/Docs/ [retrieved on May 5, 2017].

Nokia: "RF Signal Aspects to Frequency and Time Domain Implementations of SC-FDMA", 3GPP Draft, R1-050817, 3GPP TSG-RAN WG1 Meeting #42, 3rd Generation Partnership Project (3GPP), Mobile Competence Centre, 650, Route Des Lucioles, F-06921, Sophia-Antipolis, Cedex, France, vol. RAN WG1, No. London, UK, Aug. 25, 2005, Aug. 25, 2005 (Aug. 25, 2005), XP050100447, 3 Pages [retrieved on Aug. 25, 2005].

\* cited by examiner

TECHNIQUES FOR RESOURCE BLOCK ALLOCATION IN WIRELESS COMMUNICATIONS

CROSS-REFERENCE TO RELATED APPLICATION(S)

This application is a continuation of U.S. Non-Provisional application Ser. No. 16/877,834, entitled "TECHNIQUES FOR RESOURCE BLOCK ALLOCATION IN WIRELESS COMMUNICATIONS" and filed on May 19, 2020, and claims the benefit of U.S. Provisional Application Ser. No. 62/850,207, entitled "TECHNIQUES FOR RESOURCE BLOCK ALLOCATION IN WIRELESS COMMUNICATIONS" and filed on May 20, 2019, which is expressly incorporated by reference herein in its entirety.

BACKGROUND

Aspects of the present disclosure relate generally to wireless communication systems, and more particularly, to resource block allocation for time domain single-carrier waveform processing.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, increases in bandwidth may result in implementation complexities with regard to allocation of resource blocks for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a user equipment (UE) is provided. The method includes determining a guard band allocation for a single-carrier waveform associated with at least one of a time domain or frequency domain processing. The method further includes configuring data for transmission or reception according to the single-carrier waveform and based on the determined guard band allocation. The method further includes transmitting or receiving the data according to the single-carrier waveform and the determined guard band allocation to a network entity.

In a further aspect, the present disclosure includes an apparatus for wireless communication including a memory and at least one processor coupled to the memory. The at least one processor may be configured to determine a guard band allocation for a single-carrier waveform associated with at least one of a time domain or frequency domain processing, configure data for transmission or reception according to the single-carrier waveform and based on the determined guard band allocation, and transmit or receive the data according to the single-carrier waveform and the determined guard band allocation to a network entity.

In an additional aspect, the present disclosure includes an apparatus for wireless communication including means for determining a guard band allocation for a single-carrier waveform associated with at least one of a time domain or frequency domain processing, means for configuring data for transmission or reception according to the single-carrier waveform and based on the determined guard band allocation, and means for transmitting or receiving the data according to the single-carrier waveform and the determined guard band allocation to a network entity.

In yet another aspect, the present disclosure includes a computer-readable medium storing computer executable code, the code when executed by a processor cause the processor to determine a guard band allocation for a single-carrier waveform associated with at least one of a time domain or frequency domain processing, configure data for transmission or reception according to the single-carrier waveform and based on the determined guard band allocation, and transmit or receive the data according to the single-carrier waveform and the determined guard band allocation to a network entity.

According to another example, a method of wireless communication at a network entity is provided. The method includes determining, for a UE, a guard band allocation for a single-carrier waveform associated with at least one of a time domain or frequency domain processing. The method further includes transmitting an indication including the guard band allocation to the UE.

In a further aspect, the present disclosure includes an apparatus for wireless communication including a memory and at least one processor coupled to the memory. The at least one processor may be configured to determine, for a UE, a guard band allocation for a single-carrier waveform associated with at least one of a time domain or frequency domain processing, and transmit an indication including the guard band allocation to the UE.

In an additional aspect, the present disclosure includes an apparatus for wireless communication including means for determining, for a UE, a guard band allocation for a single-carrier waveform associated with at least one of a time domain or frequency domain processing, and means for transmitting an indication including the guard band allocation to the UE.

In yet another aspect, the present disclosure includes a computer-readable medium storing computer executable code, the code when executed by a processor cause the processor to determine, for a UE, a guard band allocation for a single-carrier waveform associated with at least one of a time domain or frequency domain processing, and transmit an indication including the guard band allocation to the UE.

According to an additional example, a method of wireless communication at a UE is provided. The method includes determining a resource block allocation for a single-carrier waveform associated with time domain processing. The method further includes configuring data for transmission or reception according to the single-carrier waveform and based on the determined resource block allocation. The method further includes transmitting or receiving the data according to the single-carrier waveform and the determined resource block allocation to a network entity.

In a further aspect, the present disclosure includes an apparatus for wireless communication including a memory and at least one processor coupled to the memory. The at least one processor may be configured to determine a resource block allocation for a single-carrier waveform associated with time domain processing, configuring data for transmission or reception according to the single-carrier waveform and based on the determined resource block allocation, and transmitting or receiving the data according to the single-carrier waveform and the determined resource block allocation to a network entity.

In an additional aspect, the present disclosure includes an apparatus for wireless communication including means for determining a resource block allocation for a single-carrier waveform associated with time domain processing, means for configuring data for transmission or reception according to the single-carrier waveform and based on the determined resource block allocation, and means for transmitting or receiving the data according to the single-carrier waveform and the determined resource block allocation to a network entity.

In yet another aspect, the present disclosure includes a computer-readable medium storing computer executable code, the code when executed by a processor cause the processor to determine a resource block allocation for a single-carrier waveform associated with time domain processing, configuring data for transmission or reception according to the single-carrier waveform and based on the determined resource block allocation, and transmitting or receiving the data according to the single-carrier waveform and the determined resource block allocation to a network entity.

According to another example, a method of wireless communication at a network entity is provided. The method includes determining, for a UE, a resource block allocation for a single-carrier waveform associated with a time domain processing. The method further includes transmitting an indication including the resource block allocation to the UE.

In a further aspect, the present disclosure includes an apparatus for wireless communication including a memory and at least one processor coupled to the memory. The at least one processor may be configured to determine, for a UE, a resource block allocation for a single-carrier waveform associated with a time domain processing, and transmit an indication including the resource block allocation to the UE.

In an additional aspect, the present disclosure includes an apparatus for wireless communication including means for determining, for a UE, a resource block allocation for a single-carrier waveform associated with a time domain processing, and means for transmitting an indication including the resource block allocation to the UE.

In yet another aspect, the present disclosure includes a computer-readable medium storing computer executable code, the code when executed by a processor cause the processor to determine, for a UE, a resource block allocation for a single-carrier waveform associated with a time domain processing, and transmit an indication including the resource block allocation to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
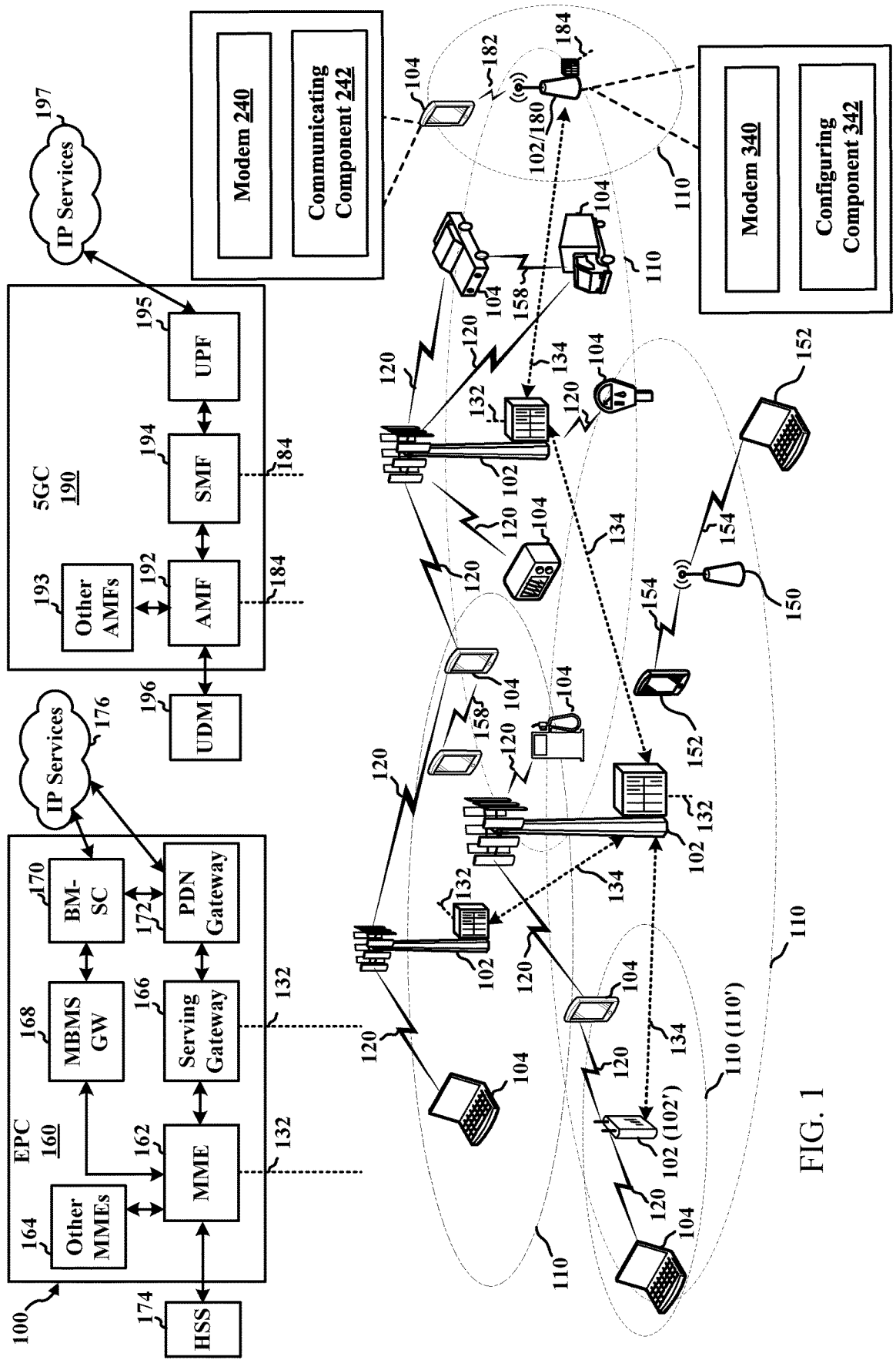
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to resource block allocation for time domain single-carrier waveform processing for higher bands operation including frequency range larger than 52.6 GHz, which can be called frequency range four (FR4). For 5G NR, communication in the FR4 spectrum may occur between 52-115 GHz in the licensed and/or unlicensed frequency bands. Specifically, a complexity of a FFT operation may be increased as the bandwidth increases (bandwidth can be larger than 1 or 2 GHz in FR4). FFT operation is required for OFDM waveform or for frequency domain implementation of single-carrier waveform. As such, time domain implementation of single-carrier waveform with cyclic prefix insertion may be used as the bandwidth increases, which has smaller complexity compared to OFDM waveform or frequency domain implementation of single-carrier waveform. For time domain implementation of single-carrier waveform, there may be a need for a guard band due to bandwidth growth associated with the time domain implementation of single-carrier waveform, which correspondingly may have different filter designs applied to different assigned bandwidths. For resource block allocations, the allocation per user equipment (UE) may be contiguous in a single-carrier waveform. A number of assigned resource blocks (e.g., which may be assigned at a bandwidth quantization level) may be limited depending on the complexity of time domain implementations. Comparatively, frequency domain implementations may be more flexible (e.g., in terms of possible number of resource blocks). Further, an exact location of the limited contiguous resource blocks can be flexible. For example, a proper phase ramping or radio frequency retuning can shift the signal to the desired frequency location. As such, it may be desirable to address guard band and resource block allocation for time domain implementations of single-carrier waveform.

For guard band allocations, an amount of guard band can be a fixed ratio of allocated bandwidth. Alternatively, the fixed ratio may be a radio resource control (RRC) configuration. Further, an amount of guard band may be a function of other parameters (e.g., besides bandwidth) such as allocated modulation and coding scheme (MCS). The mapping between guard band and those parameters may be RRC configuration. In one example of guard band allocation, a guard band may always be allocated/assumed for a single-carrier waveform. Besides the allocated resources for downlink and uplink transmissions, a gNB may always ensure sufficient guard band to allow either time domain or frequency domain processing. A node (e.g., UE or gNB) may select either time domain or frequency domain processing in transmission or reception. The choice may be known by both the transmitter and receiver.

In another example of guard band allocation, a guard band may be allocated based on capability signaling (e.g., from UE to gNB) or RRC, media access control (MAC) control element (CE), or downlink control information (DCI) signaling (e.g., from gNB to UE). A UE may indicate capability of frequency domain or time domain implementation for single-carrier waveform for transmission or reception processing. Further, the gNB may indicate the presence or absence of guard band. Specifically, if the UE indicates time domain only in capability signaling, the guard band may always be assumed. If the UE indicates frequency domain only in capability signaling, the guard band may not be allocated (e.g., or is optional). If the UE indicates both in capability signaling, the guard band allocation may be at the discretion of the gNB, which indicates the selection to the UE. If the guard band is not allocated, the UE may perform the frequency domain processing (e.g., time domain processing may be allowed only if guard band is allocated). Signaling to the UE may be conducted through RRC signaling, or can be activated through MAC-CE, or dynamically through DCI. If indicated by DCI, cross-slot scheduling (k0>0) may be applied for UE to detect DCI and utilize the corresponding processing accordingly. Within the scheduling offset, the UE may apply the previous (e.g., ongoing) processing or can be based on semi-static time domain or frequency domain configuration (e.g., a default operation is configured).

For instance, a UE may determine a guard band allocation for a single-carrier waveform associated with at least one of a time domain or frequency domain processing. The UE may further configure data for transmission or reception according to the single-carrier waveform and based on the determined guard band allocation. The UE may further transmit or receiving the data according to the single-carrier waveform and the determined guard band allocation to a network entity. Additionally, a network entity (e.g., gNB) may determine, for a UE, a guard band allocation for a single-carrier waveform associated with at least one of a time domain or frequency domain processing. The network entity may further transmit an indication including the guard band allocation to the UE.

Resource block allocations (i.e. frequency-domain resource allocation) may be determined for time domain implementation of single-carrier waveforms according to one of a number of examples. In one example, a semi-static resource block allocation (e.g., RRC configuration) may be implemented. Specifically, the resource block allocation to the UE may be assigned semi-statically through RRC signaling. The semi-static allocation may vary based on the pre-determined pattern via network entity (e.g., gNB) indication. For instance, a resource block allocation (e.g., in terms of a number of resource blocks and locations) may be different in different set of slots. DCIs may be used for scheduling for all the parameters except from frequency-domain resource allocation (FDRA). Resource block allocation may be separately determined from the RRC configured pattern (e.g. if the grant schedules PDSCH/PUSCH in the first set of slot, a first resource block allocation may be used; if in the second set of slot, a second resource block allocation may be used).

In another example of resource block allocation, resource block allocation may be based on a MAC-CE. A set of resource block allocations may be configured through RRC, and one may be activated through MAC-CE; or the resource block allocation may be directly provided in MAC-CE (e.g., without configuring a set in RRC). Resource block allocation in MAC-CE may take effect after a defined duration ('x' ms) after the UE sends the acknowledgment corresponding to the PDSCH carrying MAC-CE (e.g. x=3 ms). DCIs may be used for scheduling for all the parameters except from the FDRA. Resource block allocation activation through MAC-CE may not mean a PDSCH/PUSCH is granted, instead meaning if granted through DCI, that resource block allocation (i.e., FDRA) may be used.

In a further example of resource block allocation, a UE can be configured through RRC signaling with a set for resource block allocation. A UE may be assigned to different resource block allocations via DCI (e.g., resource block allocation chosen from the set above, or directly given in the DCI). A UE may apply the proper filtering for signal extraction/generation based on DCI along with cross-slot scheduling. A coreset may have semi-static bandwidth allocation. In some aspects, all other scheduling parameters can come in the same DCI. In some aspects related to two-stage DCI, a first-stage DCI that comes earlier may control the resource block allocation. However, the DCI may be cross-slot (e.g., to allow time for the UE to prepare). A second-stage DCI may indicate other scheduling parameters. The second-stage DCI may be faster (e.g. within slot). The first-stage DCI may not need to be sent as often as the second-stage DCI (e.g., second-stage DCI may be the one actually scheduling, the first stage changes the RB allocation in case there is scheduling).

In the examples related to the resource block allocation, different resource block allocations can be associated with different numerologies such as subcarrier spacing (SCS), cyclic prefix (CP)/guard interval (GI) length, and/or guard band. Initial resource block allocation may be obtained from coreset configuration obtained from PBCH. Further, temporary switching may allow for a timer-based mechanism for switching back to initial/default resource block allocation. After switching, another command (e.g., either MAC-CE or DCI) can be used for changing RB allocation again (e.g., including switching back). A switching gap may be defined. During the switching gap, a UE/gNB may not be able to send or receive data. Further, resource block allocation in frequency domain can be applied to both data and control.

In a first aspect, the switching gap may provide for a change to the resource block allocation (e.g., from a given (first) resource block allocation to a new (second) resource block allocation or vice versa). During the switching gap, the UE may not be able to send or receive. The above aspect may be applicable to all resource block allocation scenarios.

In some aspects, a mechanism may be provided to switch back to an initial resource block allocation. This duration may or may not be related to or associated with the switching gap. Rather, the duration may be based on a timer, e.g., when the UE is provided with a new resource block allocation, the UE may switch to the new resource block allocation (e.g., after the gap mentioned above), and may use the new resource block allocation for sending and/or receiving, and once the timer has expired, the UE may go back to the initial resource block allocation (e.g., after the gap mentioned above). In some aspects, the initial resource allocation may be determined from configurations received in PBCH. The above aspects may be applicable to MAC-CE based or DCI based scenarios, but in some aspects, not the semi-static scenario.

In a further example, a UE may determine a resource block allocation for a single-carrier waveform associated with time domain processing. The UE may further configure data for transmission or reception according to the single-carrier waveform and based on the determined resource block allocation. The UE may further transmit or receiving the data according to the single-carrier waveform and the determined resource block allocation to a network entity. In yet another example, a network entity (e.g., gNB) may determine, for a UE, a resource block allocation for a single-carrier waveform associated with a time domain processing. The network entity may further transmit an indication including the resource block allocation to the UE.

The described features will be presented in more detail below with reference to FIGS. 1-11.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining guard band and/or resource block allocations, as described herein. In addition, some nodes may have a modem 340 and configuring component 342 for determining guard band and/or resource block allocations, as described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Turning now to FIGS. 2-11, aspects are depicted with reference to one or more components and one or more methods that may perform the actions or operations described herein, where aspects in dashed line may be optional. Although the operations described below in FIGS. 4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
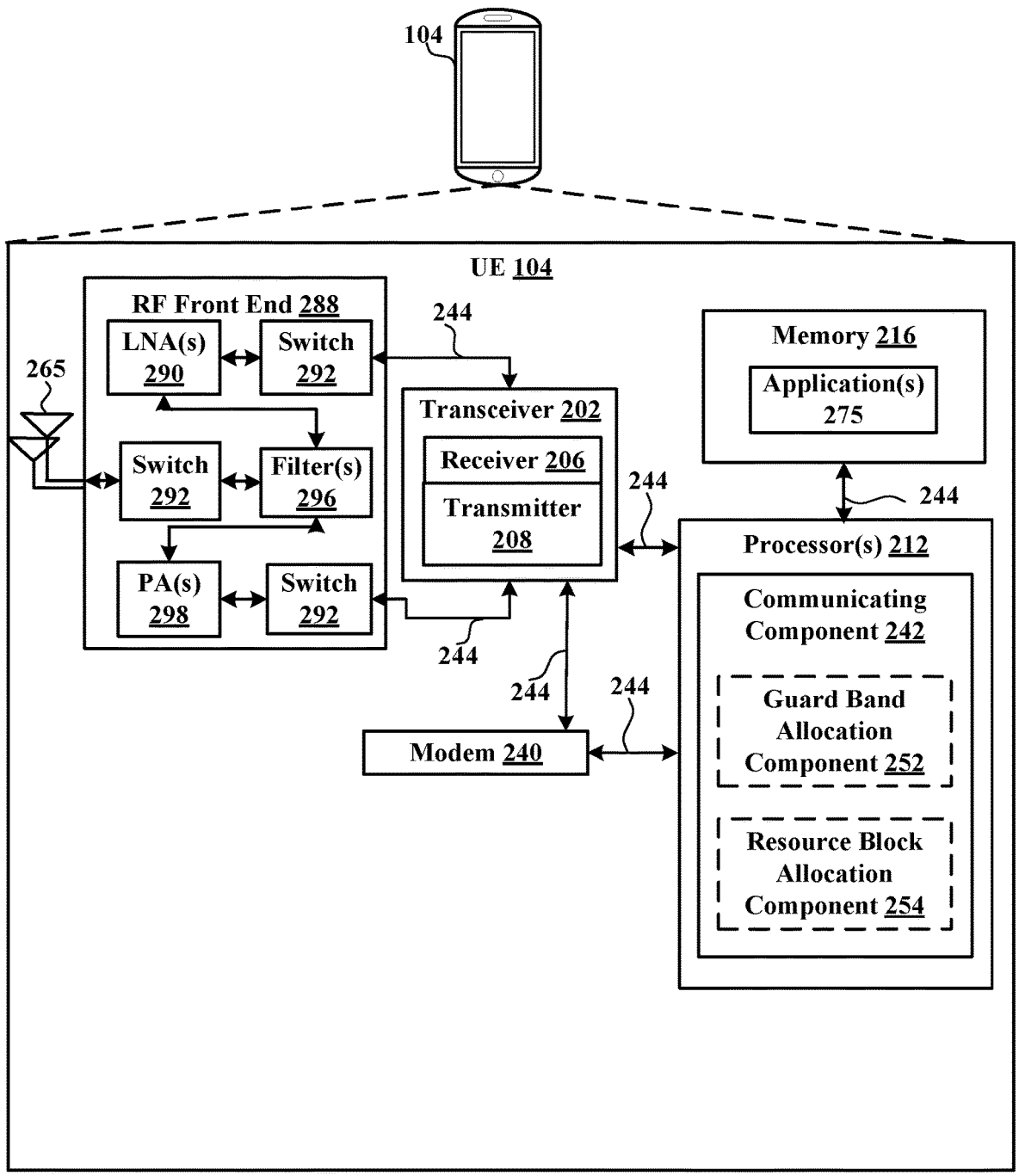
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting random access messages.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Figure 4:
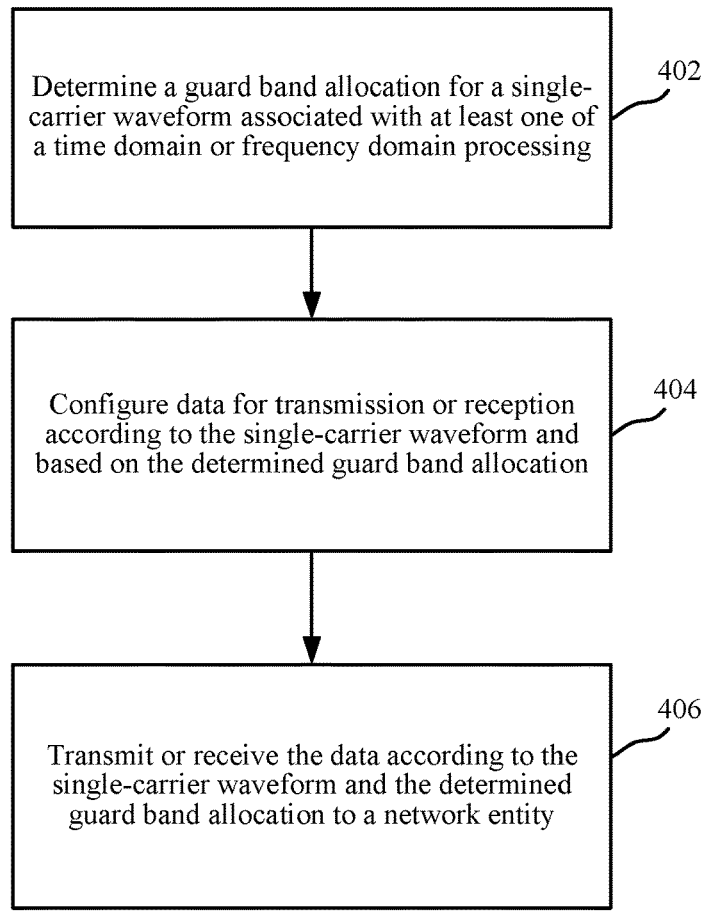
FIG. 4 is a flow chart illustrating an example of a method for determining a guard band allocation at a UE, in accordance with various aspects of the present disclosure.
Figure 6:
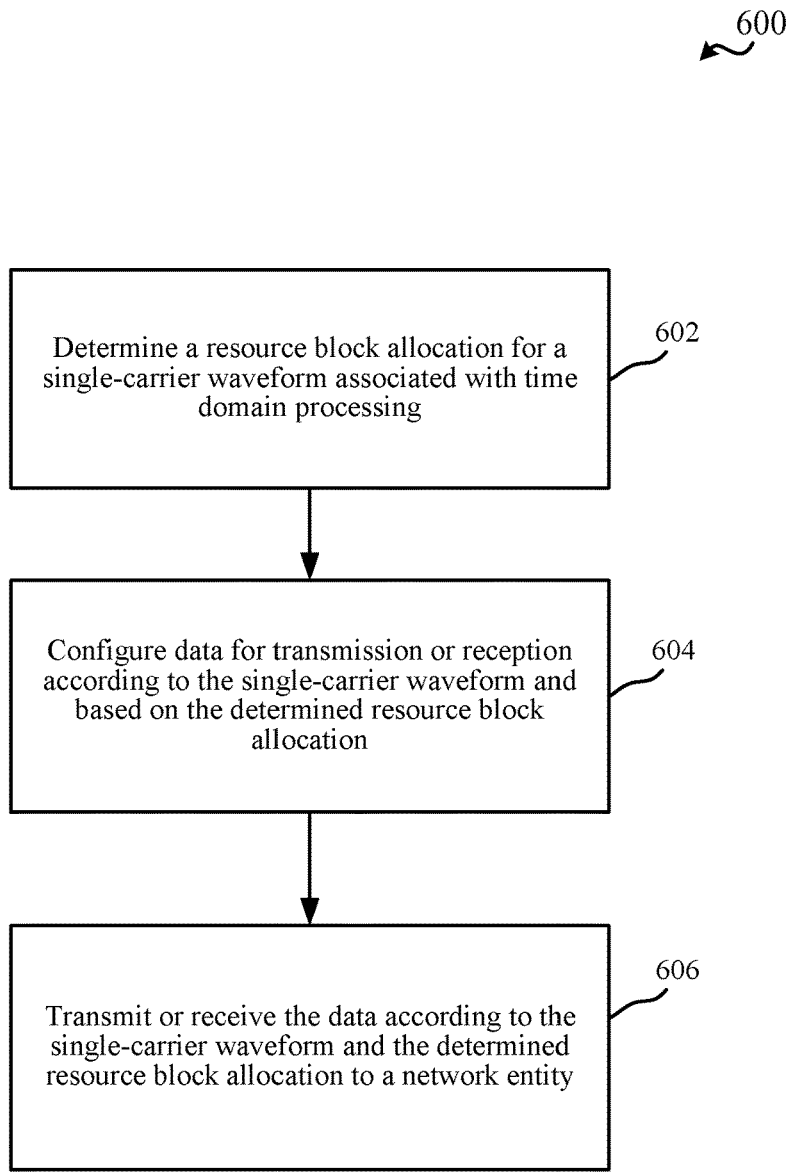
FIG. 6 is a flow chart illustrating an example of a method for determining a resource block allocation at a UE, in accordance with various aspects of the present disclosure.

In an aspect, communicating component 242 can optionally include a guard band allocation component 252 for determining a guard band allocation as further described herein with regard to FIG. 4, and a resource block allocation component 254 for determining a resource block allocation as further described herein with regard to FIG. 6.

In an aspect, the processor(s) 212 may correspond to one or more of the processors described in connection with the UE in FIG. 11. Similarly, the memory 216 may correspond to the memory described in connection with the UE in FIG. 11.

Figure 3:
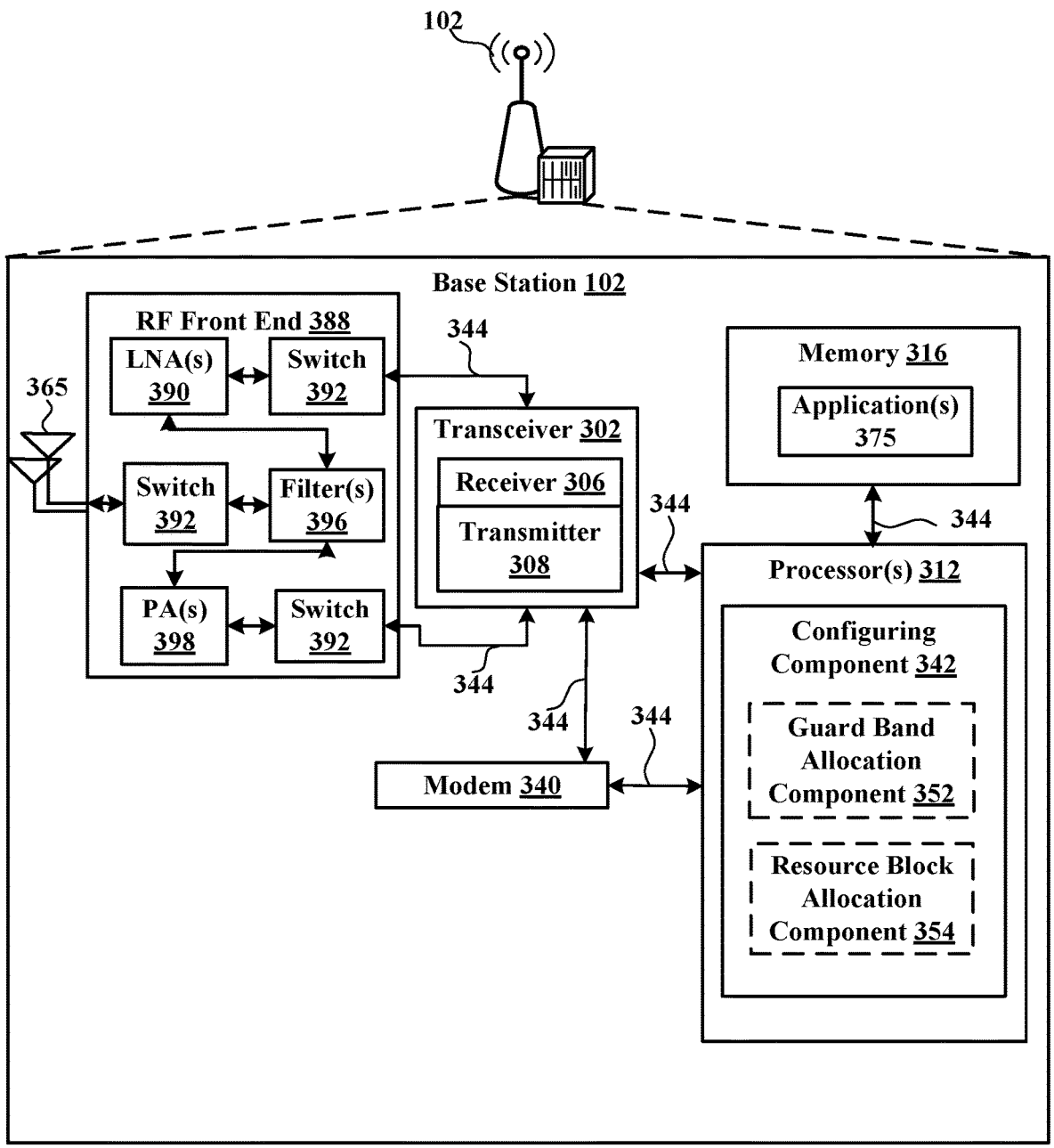
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for scheduling or otherwise enabling usage of resources for transmitting random access messages, transmitting response messages to the random access messages, etc.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

Figure 5:
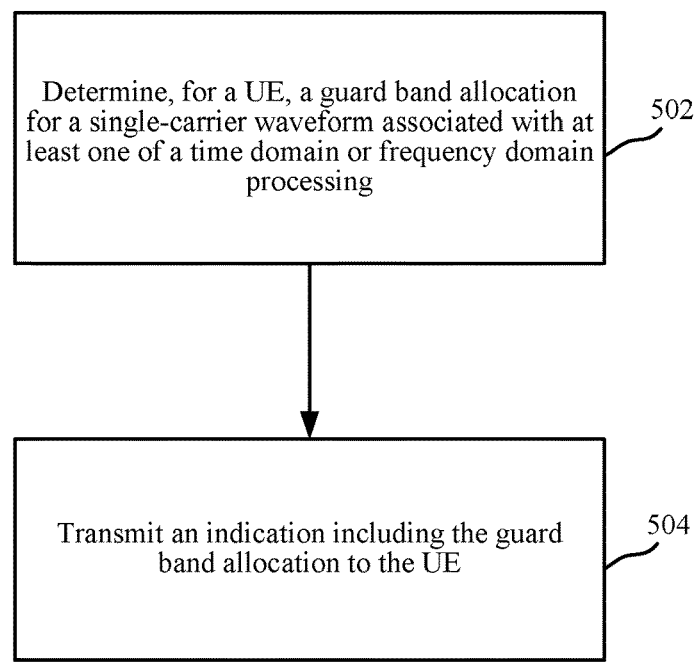
FIG. 5 is a flow chart illustrating an example of a method for determining a guard band allocation at a network entity, in accordance with various aspects of the present disclosure.
Figure 7:
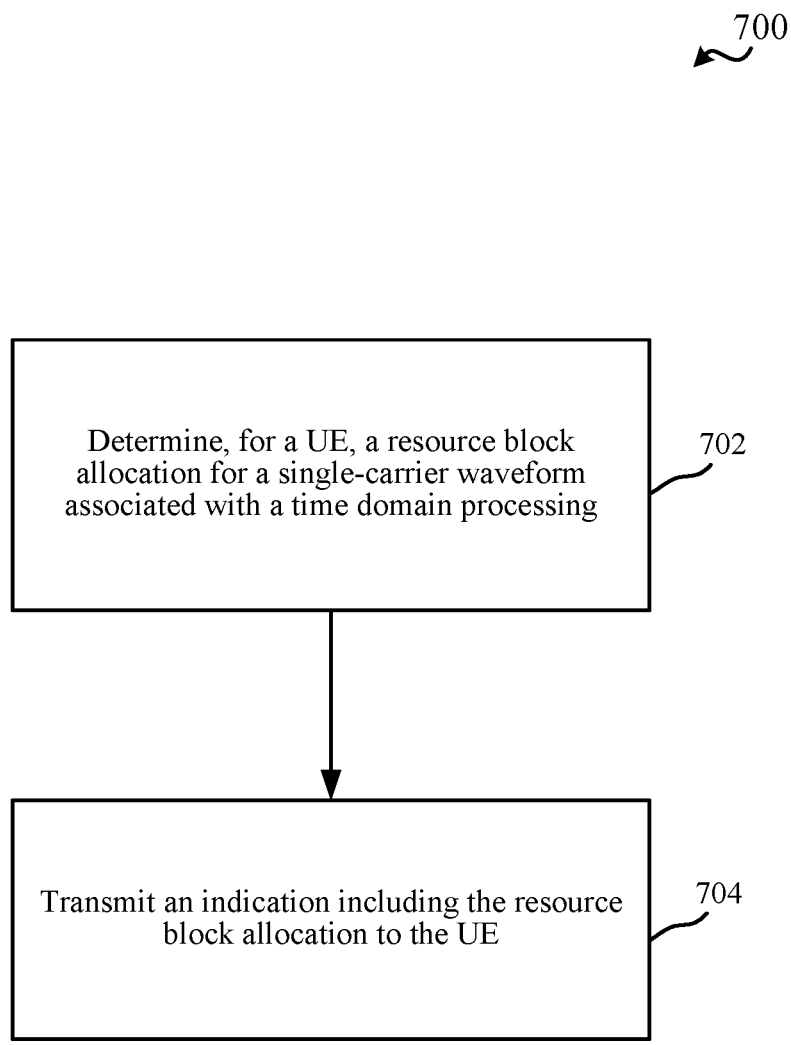
FIG. 7 is a flow chart illustrating an example of a method for determining a resource block allocation at a network entity, in accordance with various aspects of the present disclosure.

In an aspect, configuring component 342 can optionally include a guard band allocation component 352 for determining a guard band allocation as further described herein with regard to FIG. 5, and a resource block allocation component 354 for determining a resource block allocation as further described herein with regard to FIG. 7.

In an aspect, the processor(s) 312 may correspond to one or more of the processors described in connection with the base station in FIG. 11. Similarly, the memory 316 may correspond to the memory described in connection with the base station in FIG. 11.

FIG. 4 illustrates a flow chart of an example of a method 400 for determining a guard band allocation at a UE. In one example, a UE 104 can perform the functions described in method 400 using one or more of the components described in FIGS. 1, 2, and 11.

At block 402, the method 400 may determine a guard band allocation for a single-carrier waveform associated with at least one of a time domain or frequency domain processing. In an aspect, guard band allocation component 252, e.g., in conjunction with processor(s) 212, memory 216, transceiver 202, communicating component 242, etc., may be configured to determine a guard band allocation for a single-carrier waveform associated with at least one of a time domain or frequency domain processing.

In some aspects, the guard band allocation may correspond to at least one of a fixed ratio of an allocated bandwidth or a function of one or more non-bandwidth parameters. In some aspects, the fixed ratio may be configured through RRC, and the one or more non-bandwidth parameters includes a MCS. In some aspects, determining the guard band allocation may include receiving the guard band allocation from the network entity for at least one of the time domain or frequency domain processing. In some aspects, configuring the data for transmission or reception may include selecting at least one of the time domain or frequency domain processing, and transmitting the selection of at least one of the time domain or frequency domain processing to the network entity.

In some aspects, the guard band allocation may be further determined based on capability signaling transmitted to the network entity, and the capability signaling may include an indication of at least one of a time domain or frequency domain processing.

In some aspects, the indication of frequency domain processing in the capability signaling indicates at least one of an optional guard band allocation or no guard band allocation.

In some aspects, the indication of both time domain and frequency domain processing triggers a selection of the guard band allocation by the network entity.

In some aspects, determining the guard band allocation may include receiving a guard band allocation indication from the network entity corresponding at least one of a presence of the guard band allocation or an absence of the guard band allocation.

In some aspects, configuring the data for transmission or reception may include configuring the data based on the frequency domain processing in response to receiving the guard band allocation corresponding to the absence of the guard band allocation or the time domain processing in response to receiving the guard band allocation corresponding to the presence of the guard band allocation.

In some aspects, determining the guard band allocation is based on determining whether a guard band indication is received from the network entity, and the guard band indication corresponds to at least one of a RRC message, a MAC CE, or DCI.

At block 404, the method 400 may configure data for transmission or reception according to the single-carrier waveform and based on the determined guard band allocation. In an aspect, guard band allocation component 252, e.g., in conjunction with processor(s) 212, memory 216, transceiver 202, communicating component 242, etc., may be configured to configure data for transmission or reception according to the single-carrier waveform and based on the determined guard band allocation.

At block 406, the method 400 may transmit or receive the data according to the single-carrier waveform and the determined guard band allocation to a network entity. In an aspect, guard band allocation component 252, e.g., in conjunction with processor(s) 212, memory 216, transceiver 202, communicating component 242, etc., may be configured to transmit or receive the data according to the single-carrier waveform and the determined guard band allocation to a network entity.

FIG. 5 illustrates a flow chart of an example of a method 500 for wireless communication at a network entity 102. In an example, a base station 102 can perform the functions described in method 500 using one or more of the components described in FIGS. 1, 3 and 11.

At block 502, the method 500 determine, for a UE, a guard band allocation for a single-carrier waveform associated with at least one of a time domain or frequency domain processing. In an aspect, preamble determining component 252, e.g., in conjunction with processor(s) 212, memory 216, transceiver 202, communicating component 242, etc., can transmit, to the base station (e.g., base station 102), may be configured to determine, for a UE, a guard band allocation for a single-carrier waveform associated with at least one of a time domain or frequency domain processing.

In some aspects, determining the guard band allocation may include selecting at least one of the time domain or frequency domain processing, and transmitting the selection of at least one of the time domain or frequency domain processing to the UE.

In some aspects, the indication including the guard band allocation corresponds to at least one of a RRC message, a MAC CE, or DCI.

In some aspects, the indication including the guard band allocation indicates a presence or absence of a guard band.

Although not shown, the method 500 may receive a capability indication from the UE indicating at least one of time domain processing, frequency domain processing, or both time domain and frequency domain processing.

At block 504, the method 500 transmit an indication including the guard band allocation to the UE. In an aspect, preamble determining component 252, e.g., in conjunction with processor(s) 212, memory 216, transceiver 202, communicating component 242, etc., can transmit, to the base station (e.g., base station 102), may be configured to transmit an indication including the guard band allocation to the UE.

FIG. 6 illustrates a flow chart of an example of a method 400 for determining a guard band allocation at a UE. In one example, a UE 104 can perform the functions described in method 600 using one or more of the components described in FIGS. 1, 2 and 11.

At block 602, the method 600 may determine a resource block allocation for a single-carrier waveform associated with time domain processing. In an aspect, resource block allocation component 262, e.g., in conjunction with processor(s) 212, memory 216, transceiver 202, communicating component 242, etc., may be configured to determine a resource block allocation for a single-carrier waveform associated with time domain processing.

In some aspects, the resource block allocation is determined based on a semi-static assignment of resource blocks via RRC signaling.

In some aspects, the semi-static assignment of resource blocks varies based on a predetermined pattern received via a network entity indication.

In some aspects, at least one resource block of the resource block allocation determined based on the semi-static assignment of resource blocks via RRC signaling is activated via a MAC CE.

In some aspects, determining the resource block allocation includes receiving a MAC CE.

In some aspects, determining the resource block allocation may include transmitting an acknowledgment to the network entity in response to receiving the MAC CE, and utilizing the resource block allocation a period of time after transmission of the acknowledgment to the network entity.

In some aspects, determining the resource block allocation for the single-carrier waveform associated with time domain processing may include receiving an assignment to one or more distinct resource block allocations via DCI. In some aspects, the DCI includes a first stage cross-slot DCI controlling the resource block allocation and a second stage DCI indicating scheduling parameters.

In some aspects, determining the resource block allocation may include switching to the resource block allocation from an initial resource block allocation.

Although not shown, the method 600 may include determining whether a switch duration has been met after switching to the resource allocation, and switching to the initial resource block allocation from the resource block allocation based on determining that the switch duration has been met.

In some aspects, the switch duration may be defined based on at least one of a DCI including an indication of the switch duration, RRC signaling, or a MAC entity upon initiation of a random access procedure.

In some aspects, the resource block allocation is associated with at least one of a distinct numerology, cyclic prefix length, guard interval length, or guard band.

In some aspects, the resource block allocation is applied to one or both of data or control channel communications.

At block 604, the method 600 may configure data for transmission or reception according to the single-carrier waveform and based on the determined resource block allocation. In an aspect, resource block allocation component 262, e.g., in conjunction with processor(s) 212, memory 216, transceiver 202, communicating component 242, etc., may be configured to configure data for transmission or reception according to the single-carrier waveform and based on the determined resource block allocation.

At block 606, the method 600 transmit or receive the data according to the single-carrier waveform and the determined resource block allocation to a network entity. In an aspect, resource block allocation component 262, e.g., in conjunction with processor(s) 212, memory 216, transceiver 202, communicating component 242, etc., may be configured to transmit or receive the data according to the single-carrier waveform and the determined resource block allocation to a network entity.

FIG. 7 illustrates a flow chart of an example of a method 700 for wireless communication at a network entity 102. In an example, a base station 102 can perform the functions described in method 700 using one or more of the components described in FIGS. 1, 3 and 11.

At block 702, the method 700 may determine, for a UE, a resource block allocation for a single-carrier waveform associated with a time domain processing. In an aspect, preamble determining component 252, e.g., in conjunction with processor(s) 212, memory 216, transceiver 202, communicating component 242, etc., can transmit, to the base station (e.g., base station 102), may be configured to determine, for a UE, a resource block allocation for a single-carrier waveform associated with a time domain processing.

In some aspects, the indication is transmitted based on a semi-static assignment of resource blocks via RRC signaling.

In some aspects, the indication corresponds to a MAC CE. In some aspects, the indication corresponds to DCI.

In some aspects, the DCI includes a first stage cross-slot DCI controlling the resource block allocation and a second stage DCI indicating scheduling parameters.

At block 704, the method 700 may transmit an indication including the resource block allocation to the UE. In an aspect, preamble determining component 252, e.g., in conjunction with processor(s) 212, memory 216, transceiver 202, communicating component 242, etc., can transmit, to the base station (e.g., base station 102), may be configured to transmit an indication including the resource block allocation to the UE.

Figure 8:
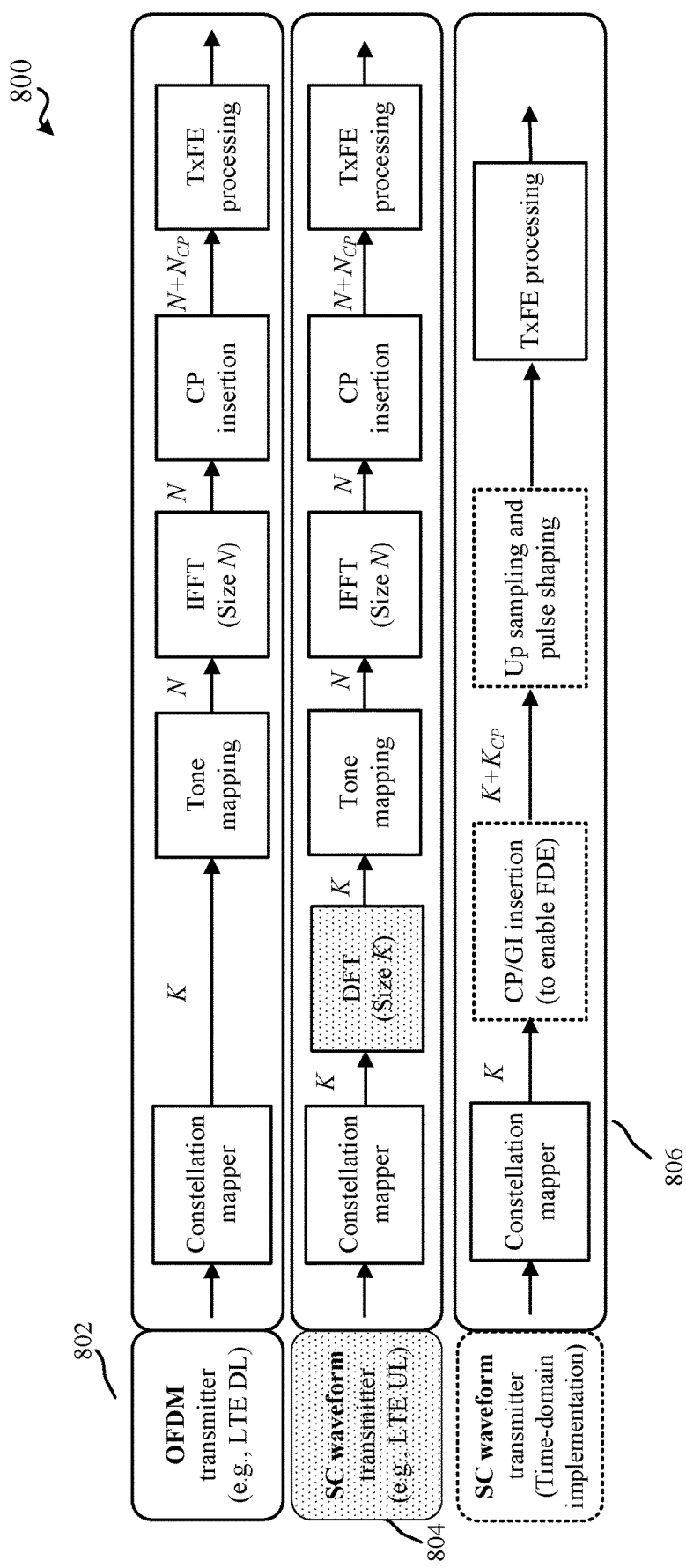
FIG. 8 is a conceptual diagram of one or more example single-carrier waveform implementations, in accordance with various aspects of the present disclosure.

FIG. 8 is a conceptual diagram of one or more single-carrier waveform implementations 800. Specifically, the one or more single-carrier waveform implementations 800 may include an orthogonal frequency division multiple access (OFDMA) in Long Term Evolution (LTE) uplink 802, a single-carrier frequency division multiple access (SC-FDMA) in Long Term Evolution (LTE) uplink 804, and a single-carrier waveform in time domain implementation 806. A single-carrier waveform may have lower ratio of peak power to the average power (PAPR) compared to OFDM, which can increase cell coverage. Further, a low complexity implementation of the single-carrier waveform may be critical for higher band such as frequency range four (FR4) (>52.6 GHz). The sampling rate may be extremely high with wide bandwidth (>1-2 GHz bandwidth). Single-carrier waveform may allow for potential time domain processing to reduce complexity. Further, at the cost of bandwidth growth (e.g., guard band may be required) due to pulse shaping.

Figure 9:
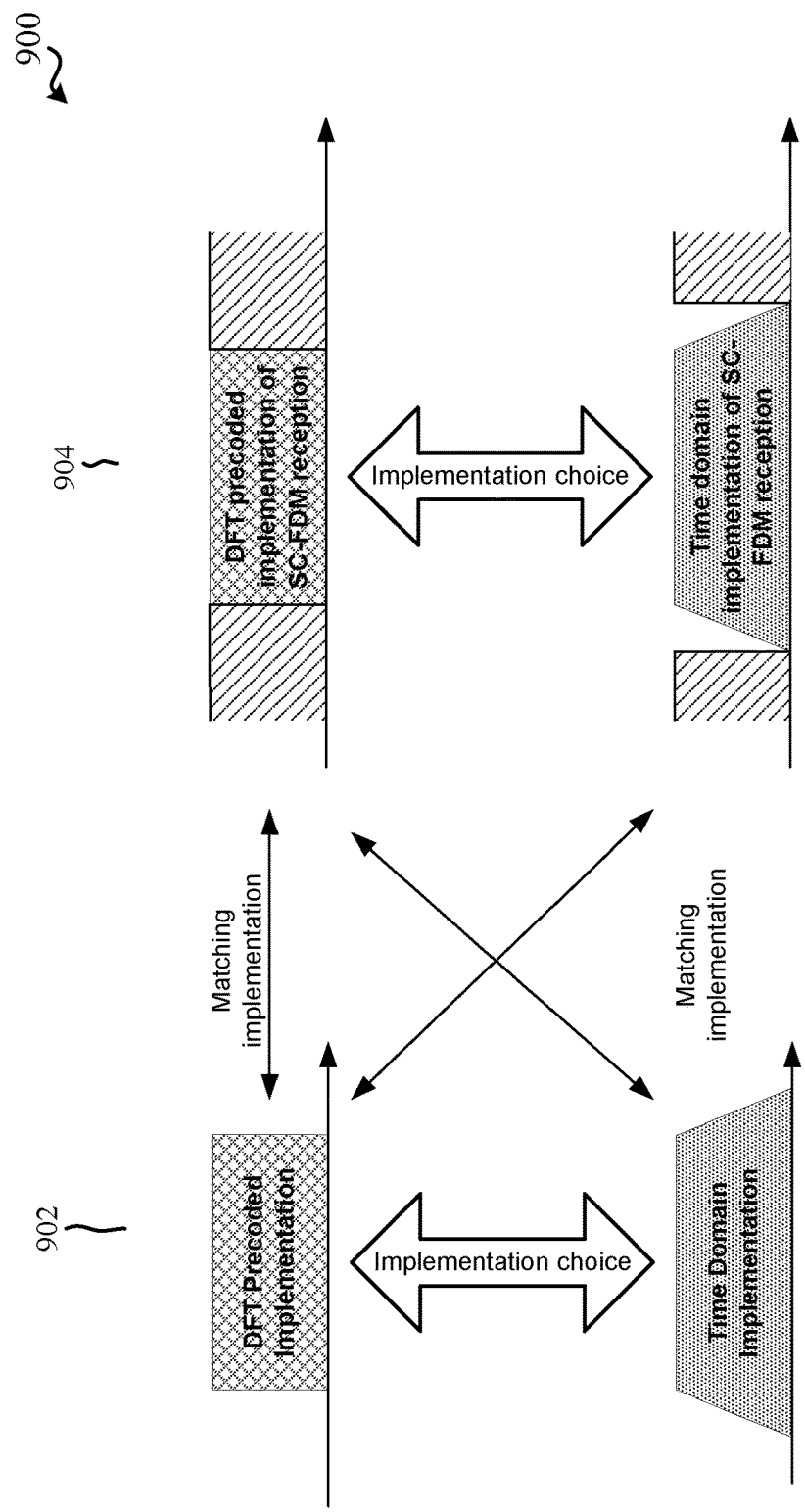
FIG. 9 illustrates a conceptual diagram of one or more example single-carrier waveform implementations at a transmitter and receiver, in accordance with various aspects of the present disclosure.

FIG. 9 illustrates a conceptual diagram of single-carrier waveform implementations 900 at a transmitter and receiver. For example, the transmitter implementation 902 may correspond to a DFT and IFFT (e.g., higher complexity) for efficient bandwidth utilization (e.g., no guard band needed). Further, direct time domain pulse shaping may be implemented for reduced transmitter complexity and peak to average power ratio (PAPR). Additionally, guard bands may be implemented for bandwidth growth. However, the transmitter implementation 902 may include additional restrictions on resource allocation (RA) bandwidth choices. For instance, the reception implementation 904 may be frequency domain processing to deal with larger delay spread and MIMO channels. Further, a time domain equalization for reduced reception complexity.

Figure 10:
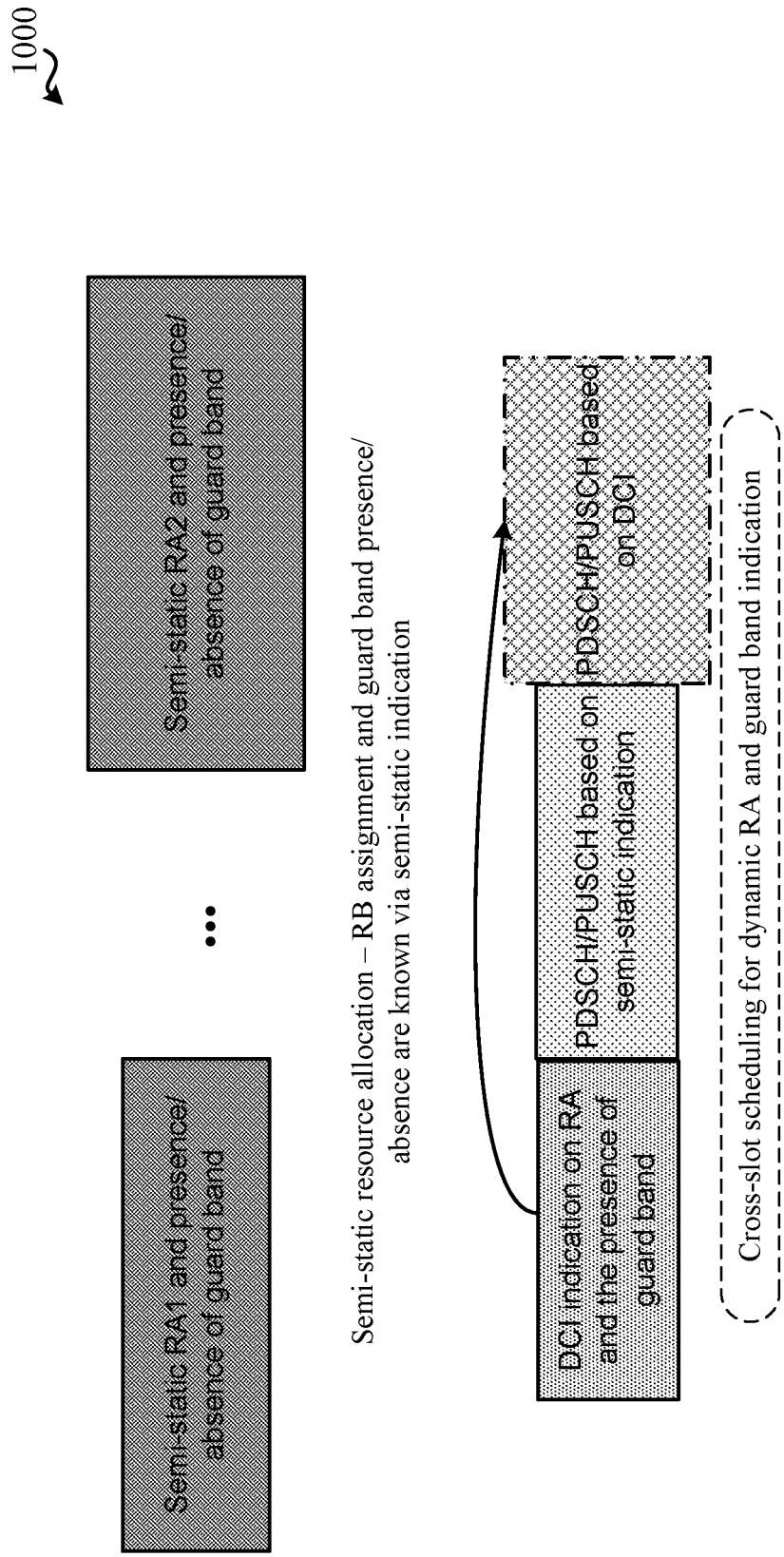
FIG. 10 illustrates an example guard band and resource block allocation, in accordance with various aspects of the present disclosure.

FIG. 10 illustrates an example guard band and resource block allocation 1000. For example, the guard band and resource block allocation 1000 may include semi-static RA1 and presence/absence of guard band. The resource block allocation 1000 may further include semi-static RA2 and presence/absence of guard band. Further, for instance, the semi-static resource allocation may correspond to resource block assignment and guard band presence/absence may be known via semi-static indication. In some aspects, the DCI indication on RA and the presence of guard band, PDSCH/

PUSCH based on semi-static indication, PDSCH/PUSCH based on DCI. Further, cross-slot scheduling for dynamic RA and guard indication.

Figure 11:
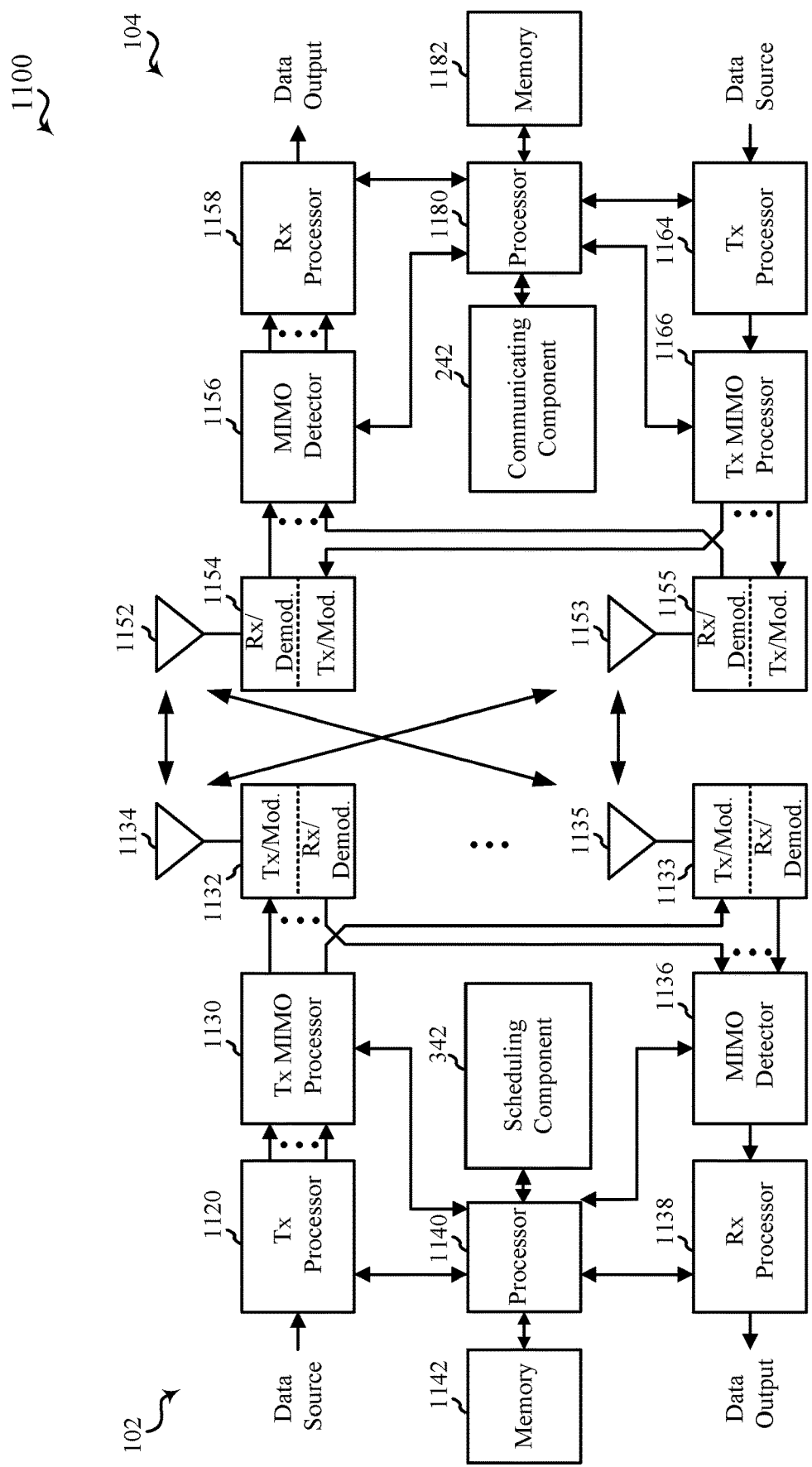
FIG. 11 is a block diagram illustrating an example of a MIMO communication system including a base station and a UE, in accordance with various aspects of the present disclosure.

FIG. 11 is a block diagram of a MIMO communication system 1100 including a base station 102 and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1-2. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor 1180, or memory 1182.

The processor 1180 may in some cases execute stored instructions to instantiate a communicating component 242 (see e.g., FIGS. 1 and 2).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for SC-FDMA, etc.), and be transmitted to the base station 102 in accordance with the communication parameters received from the base station 102. At the base station 102, the UL signals from the UE 104 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The processor 1140 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1100.

SOME FURTHER EXAMPLES

In one example, a method for wireless communication at a user equipment includes determining a guard band allocation for a single-carrier waveform associated with at least one of a time domain or frequency domain processing; configuring data for transmission or reception according to the single-carrier waveform and based on the determined guard band allocation; and transmitting or receiving the data according to the single-carrier waveform and the determined guard band allocation to a network entity.

One or more of the above examples can further include wherein the guard band allocation corresponds to at least one of a fixed ratio of an allocated bandwidth or a function of one or more non-bandwidth parameters.

One or more of the above examples can further include wherein the fixed ratio is configured through radio resource control (RRC), and wherein the one or more non-bandwidth parameters includes a modulation coding scheme (MCS).

One or more of the above examples can further include wherein determining the guard band allocation includes receiving the guard band allocation from the network entity for at least one of the time domain or frequency domain processing.

One or more of the above examples can further include wherein configuring the data for transmission or reception includes: selecting at least one of the time domain or frequency domain processing; and transmitting the selection of at least one of the time domain or frequency domain processing to the network entity.

One or more of the above examples can further include wherein the guard band allocation is further determined based on capability signaling transmitted to the network entity, and wherein the capability signaling includes an indication of at least one of a time domain or frequency domain processing.

One or more of the above examples can further include wherein the indication of frequency domain processing in the capability signaling indicates at least one of an optional guard band allocation or no guard band allocation.

One or more of the above examples can further include wherein the indication of both time domain and frequency domain processing triggers a selection of the guard band allocation by the network entity.

One or more of the above examples can further include wherein determining the guard band allocation includes receiving a guard band allocation indication from the network entity corresponding at least one of a presence of the guard band allocation or an absence of the guard band allocation.

One or more of the above examples can further include wherein configuring the data for transmission or reception includes configuring the data based on the frequency domain processing in response to receiving the guard band allocation corresponding to the absence of the guard band allocation or the time domain processing in response to receiving the guard band allocation corresponding to the presence of the guard band allocation.

One or more of the above examples can further include wherein determining the guard band allocation is based on determining whether a guard band indication is received from the network entity, and wherein the guard band indication corresponds to at least one of: a radio resource control (RRC) message, a media access control (MAC) control element (CE), or downlink control information (DCI).

In one example, a method for wireless communication at a network entity, comprising: determining, for a user equipment (UE), a guard band allocation for a single-carrier waveform associated with at least one of a time domain or frequency domain processing; and transmitting an indication including the guard band allocation to the UE.

One or more of the above examples can further include wherein determining the guard band allocation includes: selecting at least one of the time domain or frequency domain processing; and transmitting the selection of at least one of the time domain or frequency domain processing to the UE.

One or more of the above examples can further include wherein the indication including the guard band allocation corresponds to at least one of: a radio resource control (RRC) message, a media access control (MAC) control element (CE), or downlink control information (DCI).

One or more of the above examples can further include wherein the indication including the guard band allocation indicates a presence or absence of a guard band.

One or more of the above examples can further include receiving a capability indication from the UE indicating at least one of time domain processing, frequency domain processing, or both time domain and frequency domain processing.

In one example, a method for wireless communication at a user equipment, comprising: determining a resource block allocation for a single-carrier waveform associated with time domain processing; configuring data for transmission or reception according to the single-carrier waveform and based on the determined resource block allocation; and transmitting or receiving the data according to the single-carrier waveform and the determined resource block allocation to a network entity.

One or more of the above examples can further include wherein the resource block allocation is determined based on a semi-static assignment of resource blocks via radio resource control (RRC) signaling.

One or more of the above examples can further include wherein the semi-static assignment of resource blocks varies based on a predetermined pattern received via a network entity indication.

One or more of the above examples can further include wherein at least one resource block of the resource block allocation determined based on the semi-static assignment of resource blocks via RRC signaling is activated via a media access control (MAC) control element (CE).

One or more of the above examples can further include wherein determining the resource block allocation includes receiving a media access control (MAC) control element (CE).

One or more of the above examples can further include wherein determining the resource block allocation includes: transmitting an acknowledgment to the network entity in response to receiving the MAC CE; and utilizing the resource block allocation a period of time after transmission of the acknowledgment to the network entity.

One or more of the above examples can further include wherein determining the resource block allocation for the single-carrier waveform associated with time domain processing includes receiving an assignment to one or more distinct resource block allocations via downlink control information (DCI).

One or more of the above examples can further include wherein the DCI includes a first stage cross-slot DCI controlling the resource block allocation and a second stage DCI indicating scheduling parameters other than the resource block allocation.

One or more of the above examples can further include wherein determining the resource block allocation includes switching to a second resource block allocation from a first resource block allocation, the method further comprising determining whether a switch duration has been met for switching to the second resource block allocation.

One or more of the above examples can further include wherein the switch duration is defined based on at least one of: a DCI including an indication of the switch duration, RRC signaling, or a MAC CE.

One or more of the above examples can switching to the initial resource block allocation from the resource block allocation based on determining that the switch duration has been met.

One or more of the above examples can further include wherein the resource block allocation is associated with at least one of a distinct numerology, cyclic prefix length, guard interval length, or guard band.

One or more of the above examples can further include wherein the resource block allocation is applied to one or both of data or control channel communications.

In one example, a method for wireless communication at a network entity, comprising: determining, for a user equipment (UE), a resource block allocation for a single-carrier waveform associated with a time domain processing; and transmitting an indication including the resource block allocation to the UE.

One or more of the above examples can further include wherein the indication is transmitted based on a semi-static assignment of resource blocks via radio resource control (RRC) signaling.

One or more of the above examples can further include wherein the indication corresponds to a media access control (MAC) control element (CE).

One or more of the above examples can further include wherein the indication corresponds to downlink control information (DCI).

One or more of the above examples can further include wherein the DCI includes a first stage cross-slot DCI controlling the resource block allocation and a second stage DCI indicating scheduling parameters other than the resource block allocation.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication at a user equipment, comprising:
    determining a resource block allocation for a single-carrier waveform associated with time domain processing, wherein the resource block allocation is determined based on one of:
        (a) a semi-static assignment of resource blocks via radio resource control (RRC) signaling and varies based on a predetermined pattern received via a network entity indication, or
        (b) receiving a media access control (MAC) control element (CE),
    transmitting an acknowledgment to the network entity in response to receiving the MAC CE; and
    utilizing the resource block allocation a period of time after transmission of the acknowledgment to the network entity, or
        (c) receiving an assignment to one or more distinct resource block allocations via downlink control information (DCI), wherein the DCI includes a first stage cross-slot DCI controlling the resource block allocation and a second stage DCI indicating scheduling parameters other than the resource block allocation;

configuring data for transmission or reception according to the single-carrier waveform and based on the determined resource block allocation; and transmitting or receiving the data according to the single-carrier waveform and the determined resource block allocation to a network entity.

2. The method of claim 1, wherein at least one resource block of the resource block allocation determined based on the semi-static assignment of resource blocks via RRC signaling is activated via a media access control (MAC) control element (CE).

3. The method of claim 1, wherein determining the resource block allocation includes switching to a second resource block allocation from a first resource block allocation, the method further comprising:
determining whether a switch duration has been met for switching to the second resource block allocation.

4. The method of claim 3, wherein the switch duration is defined based on at least one of:
a DCI including an indication of the switch duration,
RRC signaling, or
a MAC CE.

5. The method of claim 3, further comprising switching to the initial resource block allocation from the resource block allocation based on determining that the switch duration has been met.

6. The method of claim 5, wherein the resource block allocation is associated with at least one of a distinct numerology, cyclic prefix length, guard interval length, or guard band, and wherein the resource block allocation is applied to one or both of data or control channel communications.

7. A method for wireless communication at a network entity, comprising:
determining, for a user equipment (UE), a resource block allocation for a single-carrier waveform associated with a time domain processing; and
transmitting an indication including the resource block allocation to the UE, wherein the indication corresponds to a downlink control information (DCI) that includes a first stage cross-slot DCI controlling the resource block allocation and a second stage DCI indicating scheduling parameters other than the resource block allocation.

8. An apparatus for wireless communication, comprising:
a transceiver;
a memory configured to store instructions; and
at least one processor communicatively coupled with the transceiver and the memory, wherein the at least one processor is configured to:
determine a resource block allocation for a single-carrier waveform associated with time domain processing, wherein the resource block allocation is determined based on one of:
(a) a semi-static assignment of resource blocks via radio resource control (RRC) signaling and varies based on a predetermined pattern received via a network entity indication, or
(b) receiving a media access control (MAC) control element (CE),
transmitting an acknowledgment to the network entity in response to receiving the MAC CE; and
utilizing the resource block allocation a period of time after transmission of the acknowledgment to the network entity, or
(c) receiving an assignment to one or more distinct resource block allocations via downlink control information (DCI), wherein the DCI includes a first stage cross-slot DCI controlling the resource block allocation and a second stage DCI indicating scheduling parameters other than the resource block allocation;
configure data for transmission or reception according to the single-carrier waveform and based on the determined resource block allocation; and
transmit or receiving the data according to the single-carrier waveform and the determined resource block allocation to a network entity.

9. The apparatus of claim 8, wherein at least one resource block of the resource block allocation determined based on the semi-static assignment of resource blocks via RRC signaling is activated via a media access control (MAC) control element (CE).

10. The apparatus of claim 8, wherein to determine the resource block allocation, the at least one processor is further configured to switch to a second resource block allocation from a first resource block allocation, and wherein the at least one processor is further configured to:
determine whether a switch duration has been met for switching to the second resource block allocation.

11. The apparatus of claim 10, wherein the switch duration is defined based on at least one of:
a DCI including an indication of the switch duration,
RRC signaling, or
a MAC CE.

12. The apparatus of claim 10, wherein the at least one processor is further configured to switch to the initial resource block allocation from the resource block allocation based on determining that the switch duration has been met.

13. The apparatus of claim 12, wherein the resource block allocation is associated with at least one of a distinct numerology, cyclic prefix length, guard interval length, or guard band, and wherein the resource block allocation is applied to one or both of data or control channel communications.

14. An apparatus for wireless communication, comprising:
a transceiver;
a memory configured to store instructions; and
at least one processor communicatively coupled with the transceiver and the memory, wherein the at least one processor is configured to:
determine, for a user equipment (UE), a resource block allocation for a single-carrier waveform associated with a time domain processing; and
transmit an indication including the resource block allocation to the UE, wherein the indication corresponds to a downlink control information (DCI) that includes a first stage cross-slot DCI controlling the resource block allocation and a second stage DCI indicating scheduling parameters other than the resource block allocation.

* * * * *